(12) United States Patent
Jaeger et al.

(10) Patent No.: US 6,447,397 B1
(45) Date of Patent: Sep. 10, 2002

(54) DETENT TORQUE OVERLOAD CLUTCH

(75) Inventors: Daryl J. Jaeger, Kewaskum; Scott J. Zangl, Hartford, both of WI (US)

(73) Assignee: Weasler Engineering, Inc., West Band, WI (US)

( * ) Notice: Subject to any disclaimer, the term of this patent is extended or adjusted under 35 U.S.C. 154(b) by 0 days.

(21) Appl. No.: 09/687,667

(22) Filed: Oct. 13, 2000

(51) Int. Cl.⁷ .................................................. F16D 7/10
(52) U.S. Cl. ...................... 464/37; 192/56.1; 192/89.22
(58) Field of Search ............................. 464/10, 30, 38, 464/37, 39, 1, 160; 192/56.5, 56.61, 56.56, 89.22, 56.1

(56) References Cited

U.S. PATENT DOCUMENTS

| | | | | |
|---|---|---|---|---|
| 3,228,209 A | * | 1/1966 | Hersey | 464/36 |
| 3,980,156 A | * | 9/1976 | Taylor | 267/162 |
| 4,041,729 A | * | 8/1977 | Bilz | 464/36 |
| 4,261,453 A | * | 4/1981 | Kunze | 192/56 R |
| 4,373,923 A | * | 2/1983 | Kilwin | 464/36 |
| 4,744,447 A | * | 5/1988 | Kato et al. | 464/30 |
| 5,308,281 A | * | 5/1994 | Niehaus | 464/30 |
| 5,524,870 A | * | 6/1996 | Tallent et al. | 464/38 |
| 5,681,222 A | | 10/1997 | Hansen et al. | 464/160 |
| 5,700,196 A | * | 12/1997 | Banemann et al. | 464/36 |
| 5,718,634 A | | 2/1998 | Mikeska et al. | 464/37 |
| 5,733,196 A | | 3/1998 | Nienhaus | 464/1 |
| 5,820,465 A | * | 10/1998 | Vogl | 464/36 |
| 6,059,087 A | | 5/2000 | Parry | |

FOREIGN PATENT DOCUMENTS

| | | |
|---|---|---|
| EP | 0 870 944 A1 | 10/1998 |
| JP | 05 280552 A | 10/1993 |
| WO | WO 98/06959 | 2/1998 |

OTHER PUBLICATIONS

Applicants'Exhibit A—"Belleville Washers"; p. 34; admitted prior art.
European Search Report of App. No. EP 01 20 0242 which corresponds to the present application.

* cited by examiner

*Primary Examiner*—Lynne H. Browne
*Assistant Examiner*—Kenn Thompson
(74) *Attorney, Agent, or Firm*—Quarles & Brady LLP (57) ABSTRACT

A detent type torque overload clutch has a regressive disc spring that exerts a lower engagement force in the disengaged position than in the engaged position. The force exerted by the spring initially increases to a maximum upon compression from the engagement preload on the spring, and then decreases upon further compression as the disengaged position of the detents is approached. In the disengaged position, the spring moves past flat to a concave shape in which the re-engagement force is small so that re-engagement can only occur at small relative speeds and torques.

9 Claims, 8 Drawing Sheets

DETENT TORQUE OVERLOAD CLUTCH

BACKGROUND OF THE INVENTION

1. Field of the Invention

The invention relates to torque transmitting couplings for drive lines, and in particular, to a torque overload clutch for a drive line.

2. Description of the Related Art

A driven shaft of an agricultural implement is connected to a power take-off shaft of a tractor by at least one universal joint to ensure the proper translation of torsional forces between the drive shaft and driven shaft. When attaching an agricultural implement to a tractor, it is often desirable to limit the torque which can be transmitted by the drive line. Failure to do so may result in excessive torsional forces, resulting in damage to the shafts or other elements of the implement or tractor.

Different types of torque limiting clutches are known, for example, friction, shear and detent clutches. Friction clutches transmit torque through a frictional interface and tend to wear at an undesirable rate and produce heat when the clutch disengages. Additionally, typical friction clutches don't warn or signal the operator when they disengage. As a result, the clutch may be worn out or time may be lost during operation when the user is under the false impression that the agricultural implement is operating as expected.

Previous methods to limit torque additionally include shear devices in which a shear pin is sheared off when the torque exceeds a certain level. In such devices, a pin or bolt is sheared and must be replaced each time the torque limit is exceeded.

Detent clutches provide position engagement, alert a user when the torque threshold is exceeded, and require little or no user intervention to render the device once again operational after the torque threshold has been exceeded. U.S. Pat. 5,733,196 discloses one such device which discloses a coupling having an outer housing attached to one of the shafts, and an inner housing attached to the other. Specifically, the inner and outer housings become engaged when a set of pawls move from an inner position, in which they are entirely within an opening in the inner housing, to an outward position, in which the pawls are partially disposed in the opening as well as in a recess in the outer housing, such that the two shafts are engaged to rotate together. When the torsional forces between the two shafts exceed a predetermined threshold, the pawls cam radially inward to a disengaged position against the force of a disc spring which acts axially. Once the clutch is disengaged, a radial spring moves a multi-part segmented switching ring to block re-engagement of the pawls with the recess so that the pawls do not re-engage until the speed is at a sufficiently low level, to avoid overly abrupt or jarring re-engagement.

BRIEF SUMMARY OF THE INVENTION

The present invention provides a torque limiting clutch that avoids overly abrupt or jarring re-engagement without introducing additional parts to the mechanism. In a clutch of the invention, the spring member is a regressive disc spring whose resistance decreases dramatically when compressed past a certain point, as occurs when the clutch becomes disengaged. The small residual spring force when the clutch is disengaged is sufficient, however, to bias the driving members radially outwardly to again engage the clutch with a relatively small initial re-engagement force when the relative speed and torque between the drive and driven shafts is sufficiently small or zero. The re-engagement force is also sufficient to cause the driving members to chatter as they pass by the recesses in the outer member, so as to warn the operator that the clutch has become disengaged.

In a preferred form, the spring is preloaded in the engaged position to a force which is short of the maximum force, for example 40–80% of the maximum force the spring is capable of, which typically occurs at a deflection of less than 50% of the height (height=total length−thickness) of the spring. The maximum force typically occurs at about 50% deflection, so initially the force exerted by the spring goes up as the driving members move radially inward toward disengagement. After the maximum force is passed, the force goes down, and can go down significantly if the deflection beyond the maximum force is sufficient. Hence, the disc spring preferably can deflect to and beyond the flat shape, so that it concave in the disengaged position, exerting only a very small force to bias the driving members back into re-engagement.

Preferably, the height to thickness ratio of the spring is chosen to be as high as possible, while still permitting the spring to return after being deflected past flat to a concave shape. Thus, the height to thickness ratio should be in the range of about 2.3 to 2.8, and preferably is between 2.6 and 2.8.

In another aspect of the invention, an actuator ring cams on the driving members and is biased by the spring to urge the driving members into the recesses of the outer housing. On the side of the spring opposite from the actuator ring, a compression plate retains the spring axially. The compression plate has a concave or other radially inwardly receding surface which permits the spring to assume a concave shape in the disengaged position. The compression plate also prevents the spring from being damaged by being overly flexed into a severely concave shape.

These and other features and advantages of the invention will be apparent from the detailed description and drawings.

DETAILED DESCRIPTION OF THE INVENTION

Figure 1:
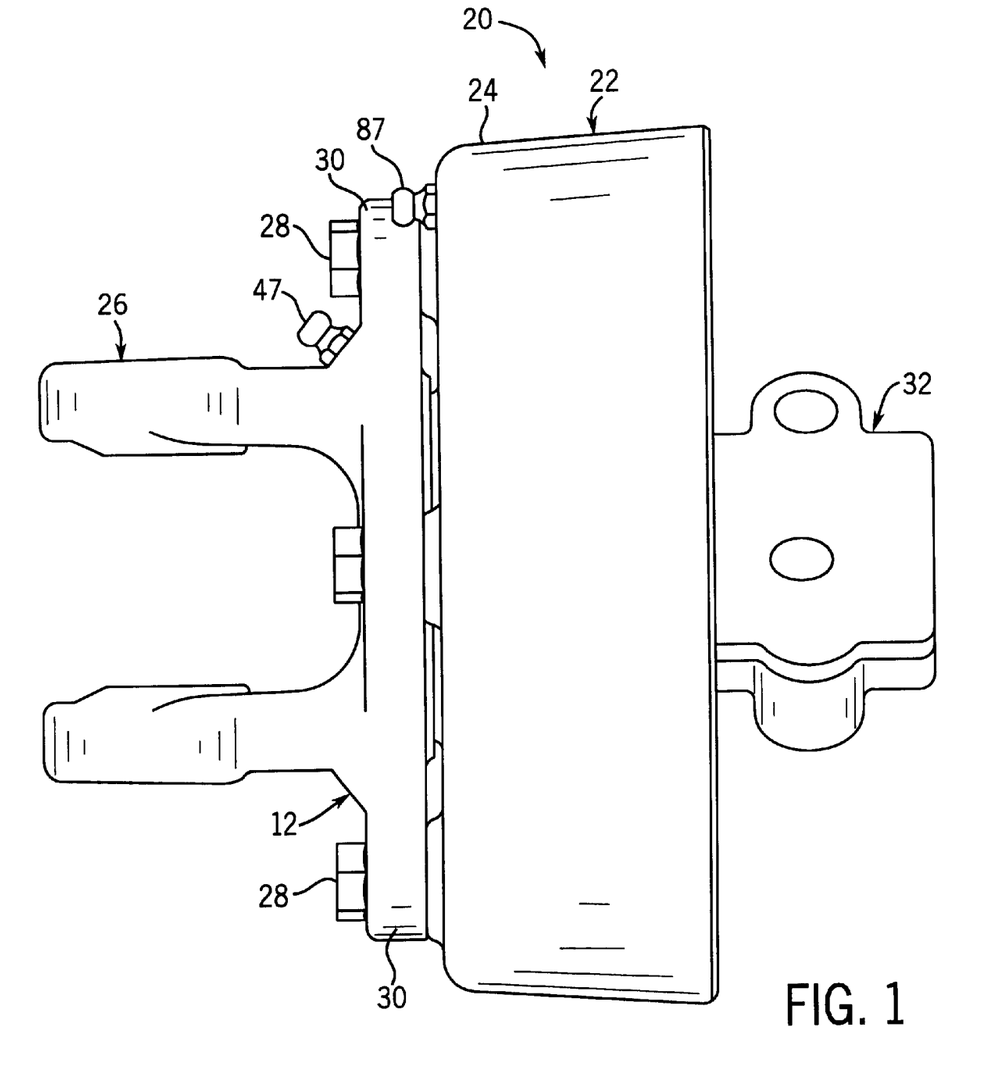
FIG. 1 is a side plan view of a coupler employing a preferred embodiment of a torque limiting clutch of the present invention.
Figure 2:
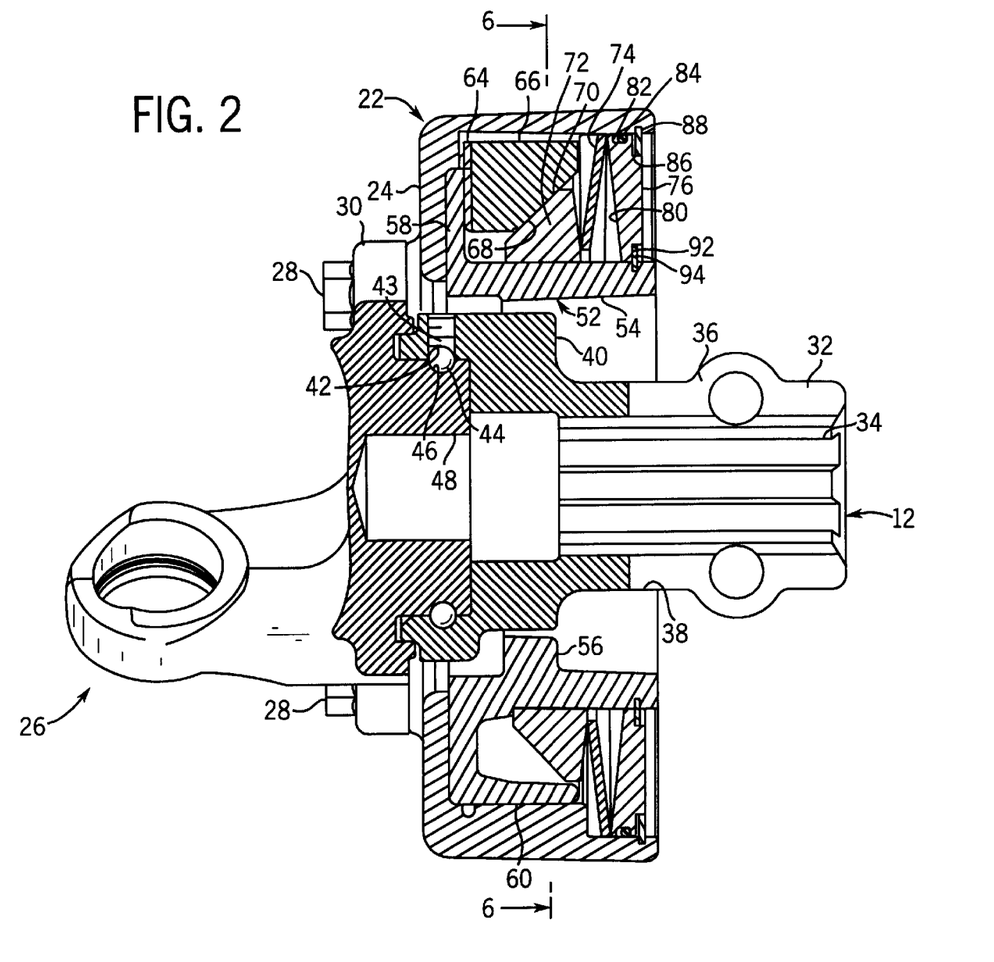
FIG. 2 is a sectional view of the coupler illustrated in FIG. 1 as viewed from a radial plane in the engaged position.
Figure 3:
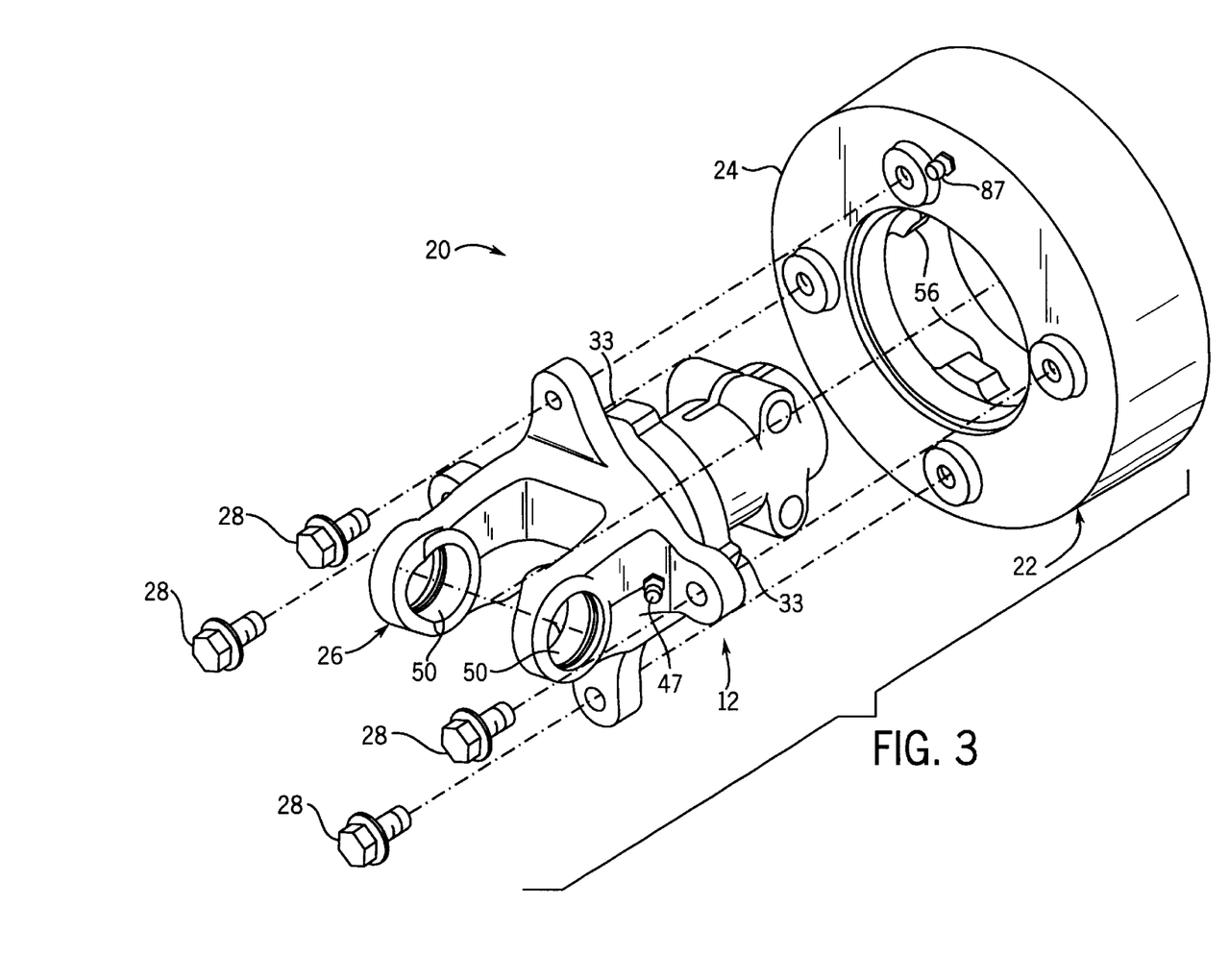
FIG. 3 is an exploded assembly view illustrating a yoke/hub subassembly of the coupler disassembled from a clutch subassembly of the coupler.

Referring to FIGS. 1–3, a coupler assembly 20 includes a torque overload clutch 22 and a yoke/hub assembly 12. The torque overload clutch 22 includes an annular outer housing 24 that is connected to yoke 26 of assembly 12 by bolts 28 that extend through legs 30 of the yoke 26.

Referring to FIG. 2, hub 32 of assembly 12 is preferably internally splined as shown at 34 to mate with the splines on a shaft to be connected to the hub 32 and may be slotted as shown at 36 and provided with bolts for clamping it to the shaft to fix it axially, for example for clamping it to an implement input shaft or power takeoff shaft of a tractor. A keyed connection or any other suitable rotary drive connection may alternatively be used. Hub 32 extends through hole 38 of the clutch 22 and, at the inner end of the hub, an axially extending flange 40 is formed and defines an outer ball bearing race 42 on its inner diameter and inner race 46 is defined on the outer diameter of the inner end of the yoke 26. A plug screw (not shown) is screwed into threaded hole 43 in the flange 40 which opens into the races 42, 46 so that the balls 44 can be loaded into the race. The anti-friction bearing provided by the balls 44 in the raceways 42 and 46 allows for relative rotation between the yoke 26 and the hub 32, while fixing the yoke 26 and the hub 32 together axially. A grease fitting 47 (FIGS. 1 and 3) is provided to lubricate the bearing.

As described above, the yoke 26 is bolted to the outer housing 24 by bolts 28, as further illustrated in FIG. 3. Holes 50 in the yoke 26 are configured to receive a universal joint cross that is secured to another universal joint yoke (not shown). The universal joint yoke is then connected to an agricultural drive line, which is driven by the power takeoff shaft of a tractor, as described in U.S. Pat. 5,681,222, the disclosure of which is hereby incorporated by reference for the purposes of background information.

An annular inner driver housing 52 of the clutch 22 includes a collar 54 having radially inwardly extending tangs 56 on the inner surface thereof that intermesh with lugs 33 on the hub 32 so as to provide a driving connection between the inner housing 52 and hub 32, which is connected to the power takeoff shaft of the tractor. The lugs 33 are considerably smaller than the interstitial spaces between the tangs 56 to provide a limited range of free motion between the yoke 26 and hub 32, to enable aligning the splines 34 with a shaft to which it is to be connected, as more filly described in U.S. Pat. No. 5,681,222.

Figure 4:
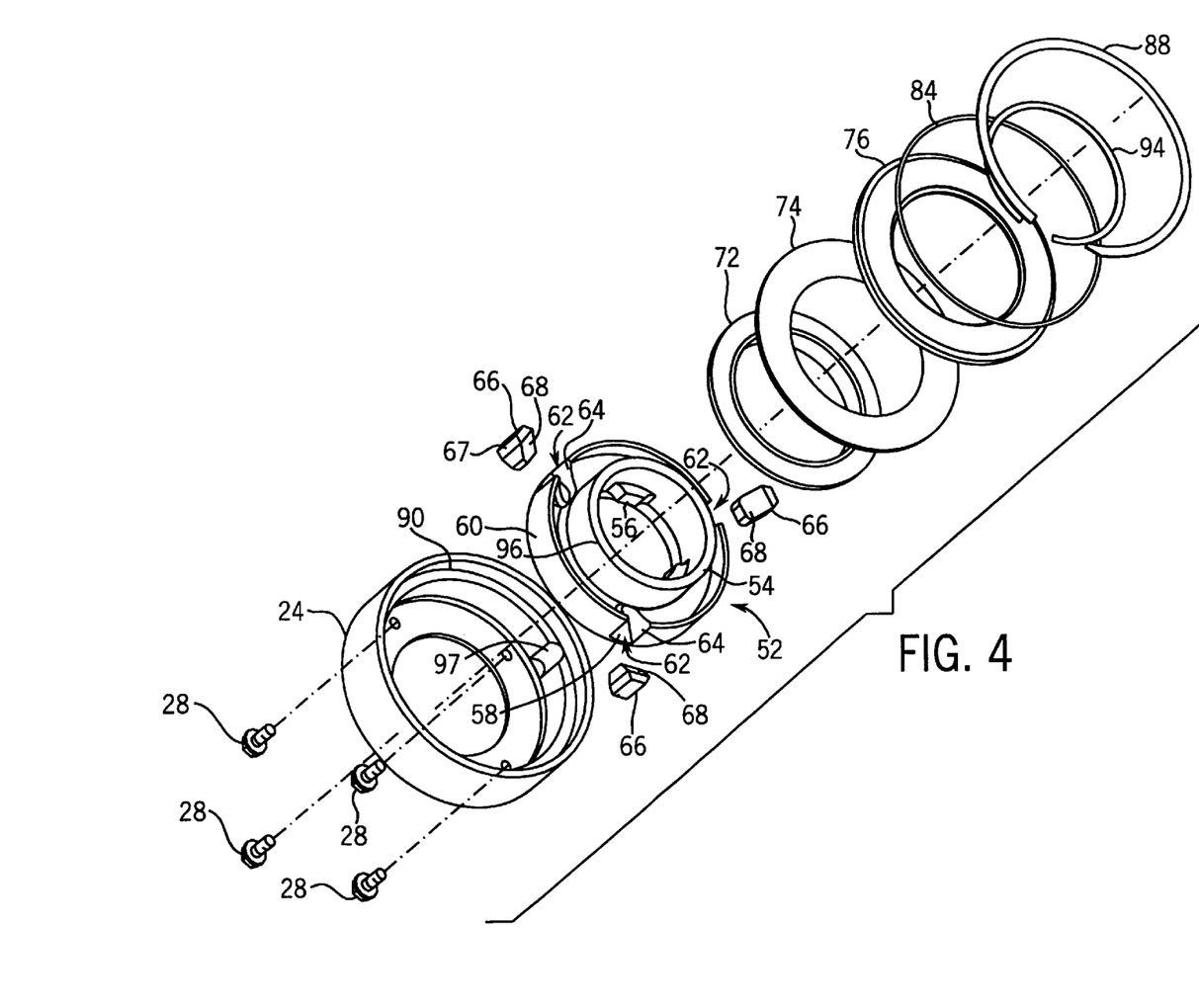
FIG. 4 is an exploded assembly view of the clutch subassembly.

Referring to FIG. 4, the annular collar 54 of the inner housing 52 is integrally connected at its outermost end to a radially outwardly extending segment 58 that is further integrally connected to an axially extending flange 60. The flange 60 has three openings 62 disposed therein, each having side walls 64. Each opening 62 is thereby shaped so as to receive a pawl 66. Each pawl 66 has a beveled surface 68 that abuts a mating beveled surface 70 of an annular actuator ring 72. An annular regressive disc spring member 74 is disposed adjacent the actuator ring 72. As will be described in more detail below, the spring member 74 exerts an axial biasing force on the actuator ring 72 so as to tend to cam the pawls 66 radially outwardly. A compression plate 76 is disposed adjacent the spring member 74 and has a frusto-conical concave surface 80 that provides sufficient clearance for the spring member 74 to move between a compressed or disengaged position, shown in FIG. 5, and an extended or engaged position as shown in FIG. 2. The surface 80 also prevents the spring member 74 from being overflexed into a severely concave shape since the spring 74 cannot be flexed any more deeply than the shape of the surface 80 permits.

Figure 5:
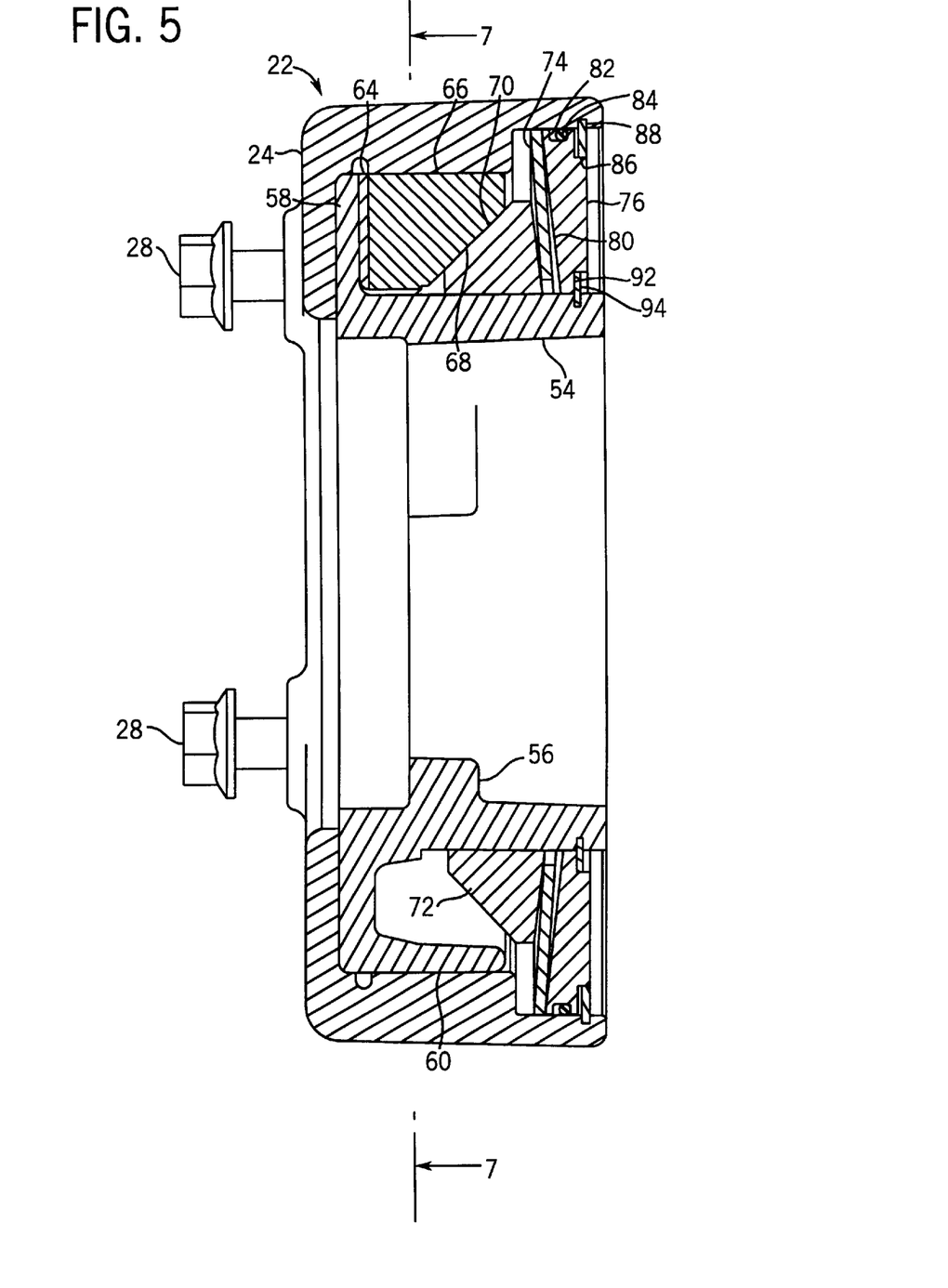
FIG. 5 is a sectional view from the plane of the line 5—5 of FIG. 7 of the clutch subassembly in the disengaged position.

Referring to FIG. 5, O-ring 84 resides in an annular groove 82 formed in the outside edge of the keeper 76 to seal against lubricant escaping from the interior of the housing 24. Grease fitting 87 (FIGS. 1 and 3) enables lubricating the interior of housing 24. Snap rings 88 and 94 are seated in respective grooves in the respective outer 24 and inner 52 housings to retain the compression plate 76 from moving axially outward. The rings 88 and 94 fit into respective undercuts 86 and 92 in the outside surface of the compression plate 76. The compression plate 76 abuts the outer edge of the spring 76 and has a concave frusto-conical surface 80 facing the spring 74, so as to give the spring 74 clearance in the disengaged position of the spring 74 as shown in FIG. 5.

Figure 6:
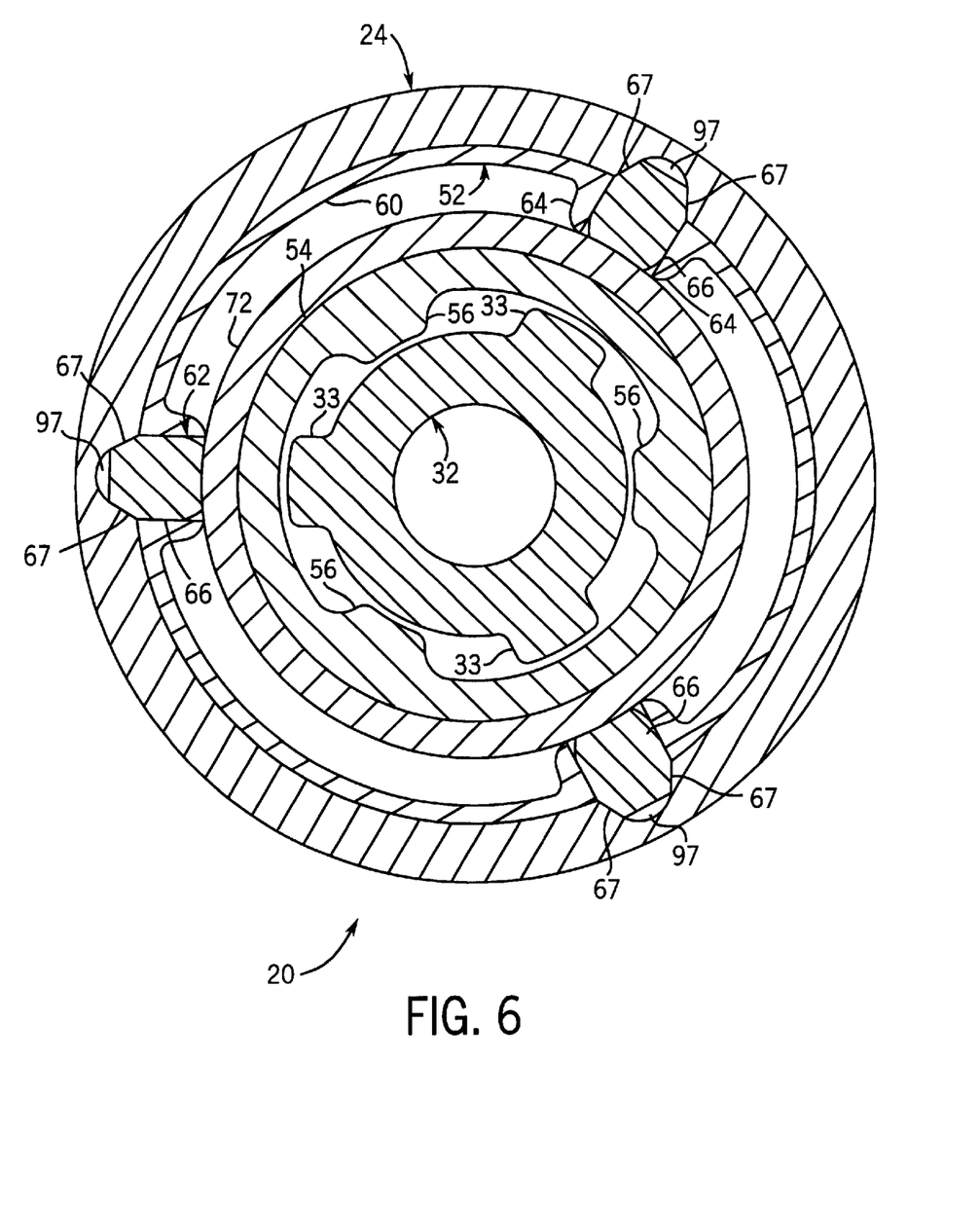
FIG. 6 is a sectional view from the plane of the line 6—6 of FIG. 2 of the coupler in the engaged position.
Figure 7:
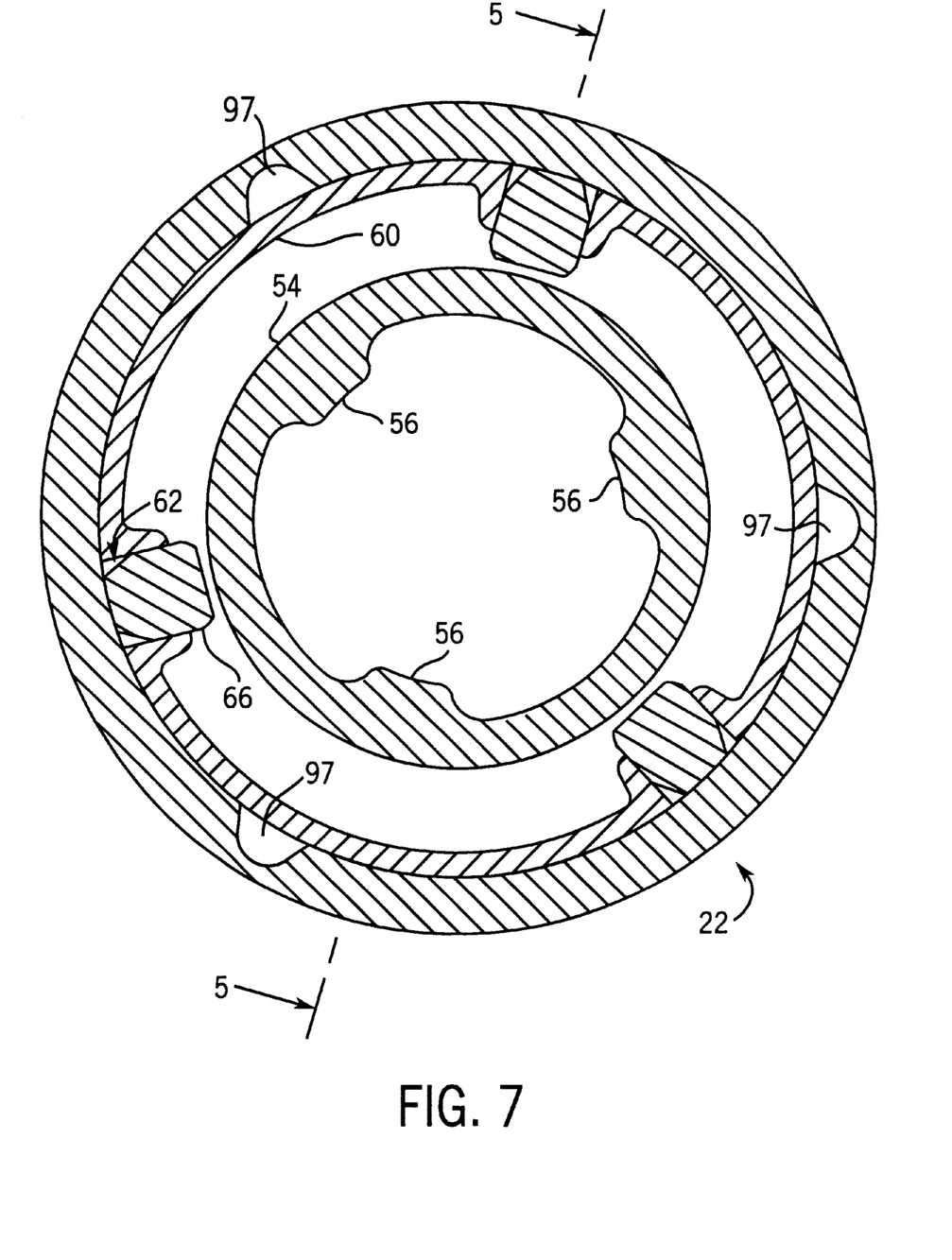
FIG. 7 is sectional view of the clutch from the plane of the line 7—7 of FIG. 5 in the disengaged position.
Figure 8:
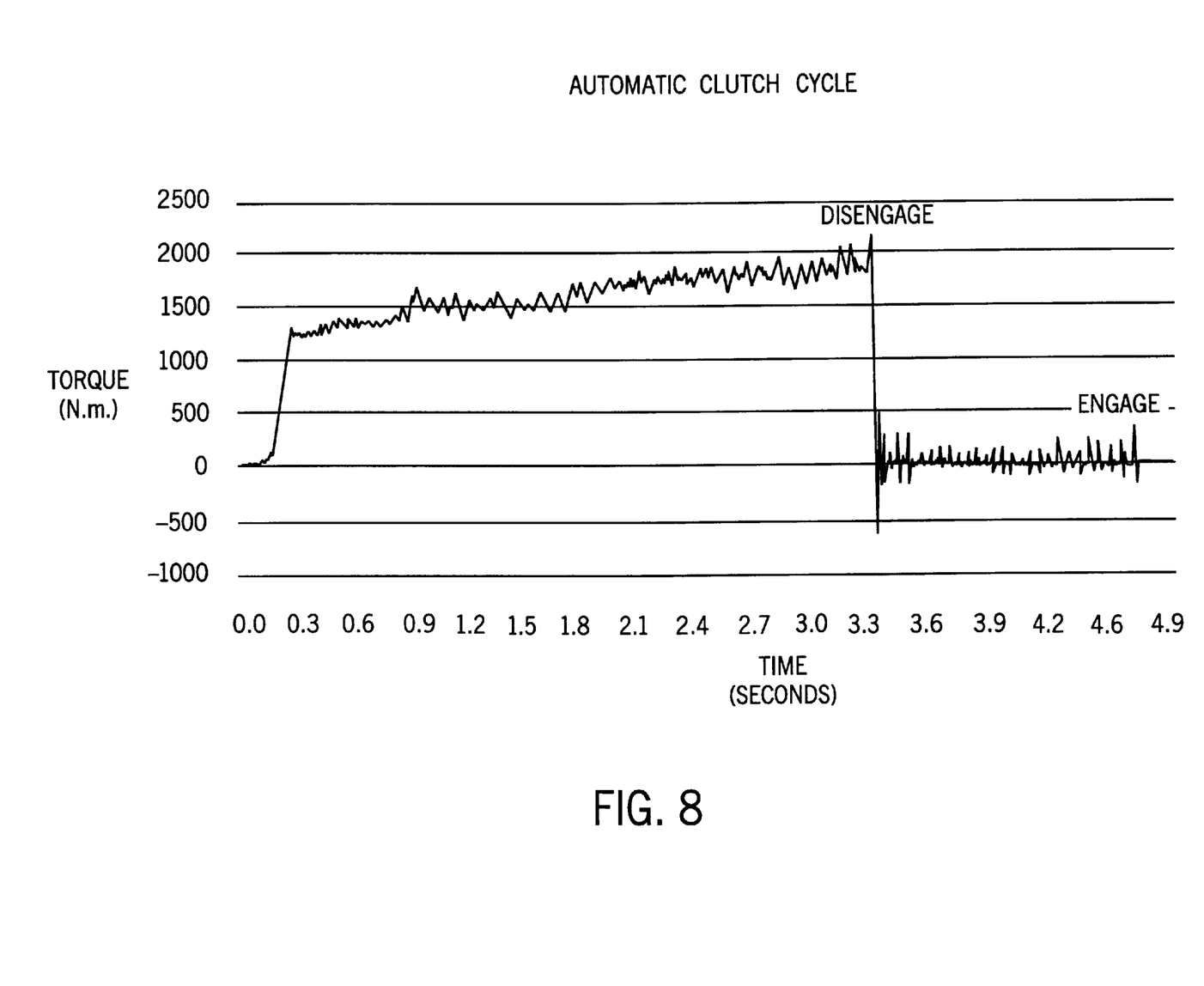
FIG. 8 is a graph illustrating a torque versus time characteristic curve for a clutch constructed in accordance with the present invention.

In operation, referring to FIGS. 6–8, the regressive disk spring 74 biases the cam ring 72 axially inwardly, toward the pawls 66, which causes the pawls 66 to cam radially outwardly along the beveled surface 70. Accordingly, when the opening 62 becomes aligned with a recess 97 in the outer housing under a sufficiently low speed and torque, the pawls 66 move radially outwardly and into the recesses 97, thereby mechanically engaging the inner and outer housings 24 and 52 to rotate together. Because the walls defining the sides of the recesses 97 are beveled to mate with beveled surfaces 67 of pawl 66, as the relative torque between the two housings 24 and 52 increases, the pawls 66 become displaced radially inwardly as they cam along the beveled surfaces of the recesses 97. When the torsional forces between the two shafts exceed the maximum torque limit of the clutch, the pawls 66 are completely withdrawn fom the recesses 97 and the clutch 22 is in the disengaged position (FIGS. 5 and 7), with the two housings 24 and 52 able to rotate relative to one another. The spring force is therefore chosen to correspond to a maximum torque limit which the clutch 22 is able to transmit, such that any torsional forces exceeding that limit will disengage the clutch 22.

The disc spring 74 is regressive and is loaded through a deflection range that takes advantage of its regressive characteristic. For the disc spring 74 to be regressive, it must have the characteristic that as deflection of the spring is increased past its maximum force, the spring continues to exert a force, although reduced from the maximum. Preferably, the spring continues to exert an axial force for deflections beyond the maximum for as large of a deflection as possible, even past the spring attaining a flat shape, so that the force becomes very small in the fully disengaged position of FIGS. 5 and 7. In addition, the slope of the force vs. deflection curve past the maximum should be as steep as possible, so that once disengagement begins, it progresses rapidly. For practicing the present invention, regressive springs having a height (equal to the uncompressed total axial length of the spring minus the thickness) to thickness ratio of about 2.3 to 2.8 should be used, with 2.6 to 2.8 being preferred and 2.7 being found suitable in use. This ratio should be as high as possible, within practical limits, but not so high that the spring will not return after being deflected past the flat position. In general, height to thickness ratios greater than about 2.8 result in the spring not returning past the flat position, and for ratios less than about 2.3 the degree of regression is not sufficient to enable a practical application of the invention.

In the preferred embodiment, the disc spring 74 is preloaded to exert an initial axial load of, for example, approximately 160–270 Kg (40–80% of maximum typical) in the fully engaged position in which the pawls 66 are fully engaged in the recesses 97 (FIG. 6). In this position, the disc spring 74 is in a normal convex frusto-conical shape in the direction shown in FIG. 2. As the torque between the inner 52 and outer 24 housings is increased beyond the limit at which disengagement begins, the pawls 66 will start camming out of the recesses 97 and the disc spring 74 will start being more compressed from its initial fully engaged compression preload, 160–270 Kg in the preferred embodiment, to a maximum at a certain deflection, which is approximately 318–340 Kg in the preferred embodiment. It achieves this maximum at a total deflection of about 50% of its uncompressed height. Beyond that, the force exerted by the spring 74 decreases to a lower level than the initial fully engaged preload. As the spring 74 continues to be deflected further, the maxmimum load is nearly halved by the time the spring attains a flat shape, and further deflection of the spring 74 past its flat shape to a concave frusto-conical shape as shown in FIG. 5 results in further reductions in the spring force. In the fully disengaged position of the pawls 66 (FIGS. 5 and 7), the force is very low, e.g., 5–10 Kg, but still exerting that force in the direction to return the pawls 66 to the recesses 97.

The result is the torque versus time curve of FIG. 8. As can be seen, disengagement occurs very abruptly at about 3.3 seconds, and re-engagement does not occur until a very low or zero torque, without significant attempts by the clutch to reengage at higher torques. This is because the force exerted by the spring 74 in disengagement is not sufficient to re-engage the clutch at anything but a very low torque. However, once re-engaged, the spring extends so that relatively high torques, e.g., approaching 2000 N.m. in FIG. 8, can be transmitted.

While the force exerted by the spring 74 in the fully disengaged position is small, it is still sufficient to urge the pawls 66 back into the recesses 97 with enough force to make a chattering noise to alert the operator that the clutch has become disengaged and to correct the problem that resulted in the torque overload. After the problem is corrected, the operator stops or slows the driveline enough to reduce the torque to a level that permits the pawls to re-engage in the recesses 97.

A preferred embodiment of the invention has been described in considerable detail. Many modifications and variations to the embodiment described will be apparent to those of ordinary skill in the art. Therefore, the invention should not be limited to the embodiment described, but should be defined by the claims which follow.

We claim:

1. In a torque overload clutch having an outer member and an inner member radially inward of said outer member, and at least one detent between said inner member and said outer member which maintains said members in rotational driving engagement with one another below a certain overload torque between said members, each said detent including a driving member which slides radially in an opening in said inner member between an engaged position in which said driving member is seated in a recess of said outer member in driving engagement with said recess and a disengaged position in which said driving member is retracted from said recess and said outer member is continuously rotatable relative to said inner member, said driving members being moved radially outward to engage in said recesses by a mechanism including a disc spring which exerts an axial spring force that biases said driving members into said engaged position, the improvement wherein:

said disc spring is regressive so that said spring force exerted by said disc spring is less in said disengaged position than in said engaged position.

2. The apparatus as recited in claim 1, wherein from said engaged position said spring force increases as said driving members move radially inwardly until a maximum spring force is reached, whereupon further radial inward movement of said driving members said spring force decreases.

3. The apparatus as recited in claim 1, wherein a first surface of said disc spring changes from a convex shape in the engaged position to a flat shape as said driving members approach said disengaged position.

4. The apparatus as recited in claim 3, wherein in said disengaged position of said driving members said first surface of said disc spring is a concave shape.

5. The apparatus as recited in claim 1, wherein said mechanism includes an actuator ring axially between said driving members and said disc spring, and said disc spring biases said actuator ring so as to cam said driving members on said actuator ring radially outwardly.

6. The apparatus as recited in claim 1, wherein said disc spring is retained axially by a keeper, and a surface of said keeper facing said disc spring recedes radially inwardly to allow said disc spring to assume a concave shape in said disengaged position of said driving members.

7. The apparatus as recited in claim 1, wherein said disc spring flexes into or past an approximately flat shape in said disengaged position.

8. The apparatus as recited in claim 1, wherein said disc spring has a height to thickness ratio in the range of about 2.3 to 2.8.

9. The apparatus as recited in claim 1, wherein said disc spring has a height to thickness ratio of 2.6 or more.

* * * * *